United States Patent
Liu et al.

(10) Patent No.: US 9,564,048 B2
(45) Date of Patent: Feb. 7, 2017

(54) ORIGIN DESTINATION ESTIMATION BASED ON VEHICLE TRAJECTORY DATA

(71) Applicants: Jing Liu, Nanjing (CN); Ye Jin, Shanghai (CN); Qiwei Zhang, Shanghai (CN); Zhongcun Wang, Beijing (CN)

(72) Inventors: Jing Liu, Nanjing (CN); Ye Jin, Shanghai (CN); Qiwei Zhang, Shanghai (CN); Zhongcun Wang, Beijing (CN)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 14/574,410

(22) Filed: Dec. 18, 2014

(65) Prior Publication Data
US 2016/0180705 A1    Jun. 23, 2016

(51) Int. Cl.
G08G 1/01 (2006.01)
G01C 21/26 (2006.01)
G08G 1/017 (2006.01)

(52) U.S. Cl.
CPC ............ *G08G 1/0125* (2013.01); *G01C 21/26* (2013.01); *G08G 1/017* (2013.01)

(58) Field of Classification Search
None
See application file for complete search history.

(56) References Cited

U.S. PATENT DOCUMENTS

| | | | | |
|---|---|---|---|---|
| 6,356,836 B1 * | 3/2002 | Adolph | .................. | G01C 21/26 701/410 |
| 8,204,974 B1 * | 6/2012 | Bhattacharyya | ...... | H04L 41/142 709/223 |
| 8,781,669 B1 * | 7/2014 | Teller | .................... | B60W 30/00 700/245 |
| 8,855,904 B1 * | 10/2014 | Templeton | ........... | G08G 1/0112 340/988 |
| 2004/0073361 A1 * | 4/2004 | Tzamaloukas | ..... | G01C 21/3691 701/414 |
| 2004/0230373 A1 * | 11/2004 | Tzamaloukas | ......... | G01C 21/28 701/468 |
| 2005/0088318 A1 * | 4/2005 | Liu | ........................ | G08G 1/161 340/902 |
| 2008/0071465 A1 * | 3/2008 | Chapman | ........... | G01C 21/3691 701/117 |

(Continued)

*Primary Examiner* — Truc M Do
(74) *Attorney, Agent, or Firm* — Horizon IP Pte. Ltd.

(57) ABSTRACT

A framework for origin-destination (OD) analysis of vehicle trajectory data is described herein. In accordance with one aspect, a vehicle trajectory dataset is provided to an OD analyzer. The vehicle trajectory dataset includes vehicle trajectory data collected from a sensor network having a plurality of sensor stations for detecting vehicles. The sensor stations of the sensor network are distributed in a geographical area of interest, where the vehicle trajectory data include trajectories of vehicles captured by the sensor network. The vehicle trajectory dataset may be analyzed by the OD analyzer to determine an origin and a destination of trips for trajectories of the vehicles in the vehicle trajectory dataset. The analysis includes calculating a probability distribution of travel time between sensor pairs of the sensor network of a number of (dropped-out) intermediate stations, and determining a stop probability between a station pair in the trajectories of the vehicles, where a stop is a destination of a previous trip and an origin of a next trip in the trajectories.

20 Claims, 6 Drawing Sheets

(56) References Cited

U.S. PATENT DOCUMENTS

| | | | |
|---|---|---|---|
| 2010/0188265 A1* | 7/2010 | Hill | G08G 1/0104 340/905 |
| 2010/0228470 A1* | 9/2010 | Sakakibara | G01C 21/32 701/532 |
| 2012/0059574 A1* | 3/2012 | Hada | G08G 1/0112 701/119 |
| 2012/0086582 A1* | 4/2012 | Durekovic | G08G 1/0112 340/903 |
| 2014/0219133 A1* | 8/2014 | Dasgupta | H04L 47/28 370/254 |

* cited by examiner

|   | VEH_PLATE | BEGINE_TIME | LONGITUDE | LATITUDE |
|---|---|---|---|---|
| 1 | 苏 70W | Jan 29, 2014 7:44:24.0 AM | 118.74179 | 32.020726 |
| 2 | 苏 70W | Jan 29, 2014 7:58:43.0 AM | 118.771895 | 32.051317 |
| 3 | 苏 70W | Jan 29, 2014 8:07:02.0 AM | 118.785135 | 32.050139 |
| 4 | 苏 70W | Jan 29, 2014 8:14:27.0 AM | 118.7821083 | 32.06070353 |
| 5 | 苏 70W | Jan 29, 2014 8:18:18.0 AM | 118.776583 | 32.06556791 |
| 6 | 苏 70W | Jan 29, 2014 7:45:17.0 AM | 118.807966 | 32.055872 |
| 7 | 苏 70W | Jan 29, 2014 7:48:20.0 AM | 118.80052 | 32.022731 |
| 8 | 苏 70W | Jan 29, 2014 7:53:14.0 AM | 118.8097994 | 32.00237449 |
| 9 | 苏 70W | Jan 29, 2014 8:07:05.0 AM | 118.80935 | 32.006889 |
| 10 | 苏 70W | Jan 29, 2014 10:15:40.0 AM | 118.7355773 | 31.98664212 |

FIG. 4

| | Stop Probability | Stopped? |
|---|---|---|
| 1→2 | 0.45 | No |
| 2→3 | 0.04 | Yes |
| 3→4 | 0.25 | No |
| 4→5 | 0.06 | No |
| 5→6 | 0.00 | Yes |
| 6→7 | 0.76 | No |
| 7→8 | 0.77 | No |
| 8→9 | 0.24 | No |
| 9→10 | 0.00 | Yes |

FIG. 5

ORIGIN DESTINATION ESTIMATION BASED ON VEHICLE TRAJECTORY DATA

TECHNICAL FIELD

The present disclosure relates to computer systems, and more specifically, to a framework for estimating origins and destinations based on vehicle trajectory data.

BACKGROUND

Transportation is an important aspect of a city's operations. For example, transportation is central to many traffic planning, analysis or visualization systems. Origin-destination (OD) analysis is employed to provide an understanding of traffic patterns. Conventional OD analysis includes the use of a survey of a sampled sub-population. The use of surveys is expensive and time consuming. Other types of OD analysis relies on GPS-equipped floating vehicles, such as taxis. However, the use of floating vehicles involves only a small fraction of daily traffic volume in an urban area and tends to generate biased estimate of OD patterns.

From the foregoing discussion, it is desirable to provide an efficient and accurate OD analysis to understand traffic pattern.

SUMMARY

A framework for origin-destination (OD) analysis of vehicle trajectory data is described herein. In accordance with one aspect, a vehicle trajectory dataset is provided to an OD analyzer. The vehicle trajectory dataset includes vehicle trajectory data collected from a sensor network having a plurality of sensor stations for detecting vehicles. The sensor stations of the sensor network are distributed in a geographical area of interest, where the vehicle trajectory data include trajectories of vehicles captured by the sensor network. The vehicle trajectory dataset may be analyzed by the OD analyzer to determine an origin and a destination of trips for trajectories of the vehicles in the vehicle trajectory dataset. The analysis includes calculating a probability distribution of travel time between sensor pairs of the sensor network of a number of (dropped-out) intermediate stations, and determining a stop probability between a station pair in the trajectories of the vehicles, where a stop is a destination of a previous trip and an origin of a next trip in the trajectories.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows exemplary pre-processed data;
FIG. 5 shows an exemplary result of OD analysis.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for origin-destination (OD) analysis of vehicles is described herein. In accordance with one aspect, the present framework employs a sensor network to track vehicle trajectories. The framework analyzes trajectories and divides them into individual OD trips. For example, a vehicle's trajectory may include multiple trips. For example, from home to work, work to lunch, lunch to work and work to home. The framework analyzes a trajectory of a vehicle within a period and determines multiple ODs from it. The period may be any period. For example, the period may be daily, multiple days, weekly, monthly. Other durations of time may also be useful. For example, the period may be less than a day. As such, the framework enables efficient and accurate determination of traffic patterns, facilitating traffic planning, analysis or visualization systems. The traffic patterns may be used for other applications. For example, the traffic patterns may be used to determine toll locations to alleviate congestion, road construction planning, city planning, such as workplace-residence separation patterns for urbanization planning, as well as others.

In one implementation, the framework may continuously collect vehicle trajectory data for analysis. The vehicle trajectory data is collected from a sensor network. The data is analyzed to determine ODs of the vehicles. In one implementation, the data, for example, is analyzed offline to determine ODs of the vehicles. Providing on-line or real time analysis of vehicle trajectories may also be useful.

As will be discussed herein, vehicles, for example, may refer to any type of vehicles (including buses, cars, trucks, and vans). It should be appreciated that the framework described herein may be implemented as a method, a computer-controlled apparatus, a computer process, a computing system, or as an article of manufacture such as a computer-usable medium. These and various other features will be apparent from the following description.

Figure 1:
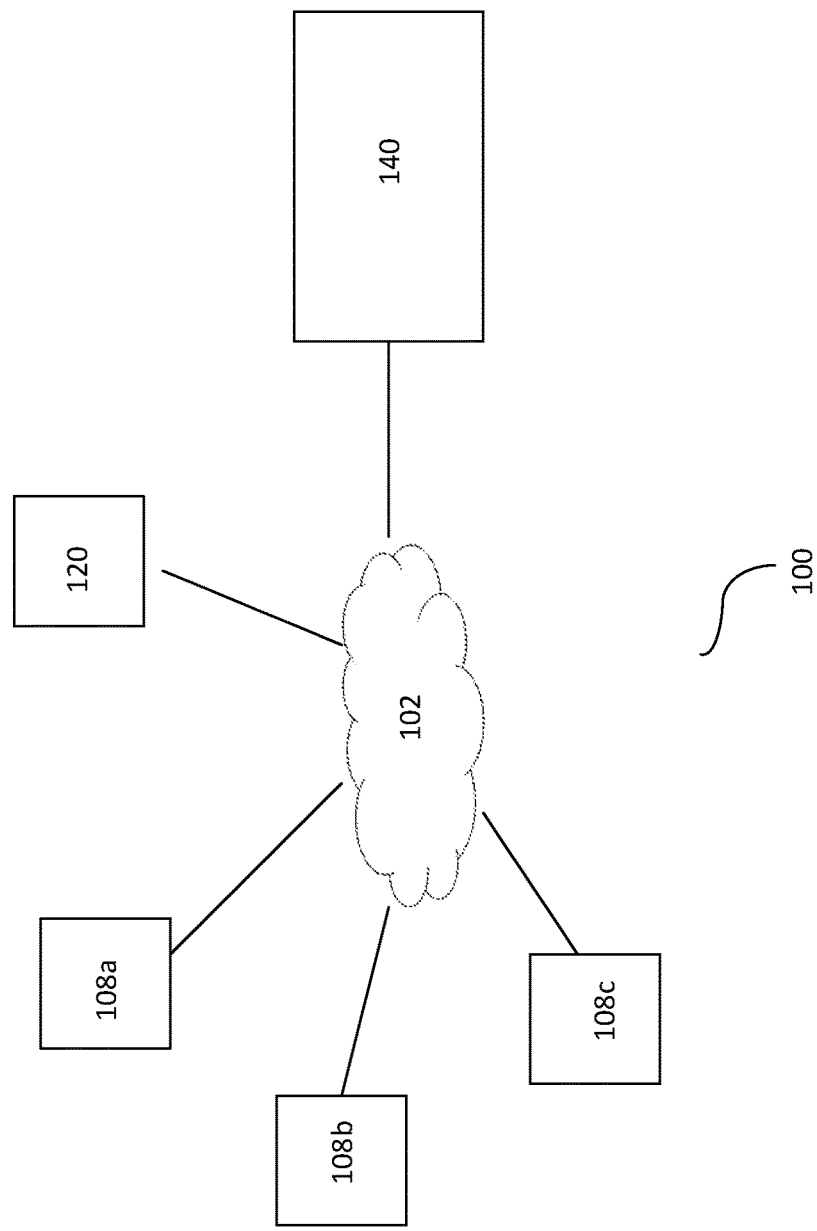
FIG. 1 shows a simplified exemplary OD analysis system.

FIG. 1 shows a simplified diagram of an exemplary OD environment 100. The environment 100, for example, facilitates OD analysis on collected trajectory data of vehicles within a geographical area of interest. The geographical area of interest, for example, may be a city or town. Other types of geographical areas may also be useful. The OD analysis facilitates, for example, traffic planning within the geographical area of interest. The OD analysis may also be used for other purposes within the geographical area of interest.

As shown, the environment includes a data collection unit 120 and a trajectory analysis system 140. The data collection unit includes a sensor network of sensor stations distributed in a geographical area of interest for capturing vehicle information. In one implementation, a sensor station includes a fixed traffic sensor. Fixed traffic sensors may include radio-frequency identification (RFID) sensors and license plate recognition (LPR) sensors. Other types of fixed traffic sensor may also be useful. A sensor station may include one or both type of sensors. For example, a sensor station may include either a RFID sensor or a LPR sensor or both types of sensors. Other configuration of sensor stations may also be useful. It is understood that not all the sensor stations need to be configured the same. In the case a station includes both types of sensors, for example RFID and LPR sensors, data from each sensor may be stored and processed separately.

A RFID sensor captures information from vehicles equipped with RFID transmitters when they pass the sensor. For example, vehicle information is transmitted by the RFID transmitter. When a vehicle passes a RFID sensor, it reads the information transmitted. A LPR sensor, on the other hand, detects a vehicle and captures the license plate of the vehicle. For example, an LPR sensor may include a camera which detects and captures an image of a vehicle passing it. The image is processed using image recognition processor. The image recognition processor recognizes and extracts the license plate number from the image. The image recognition processor may be integrated into the sensor network or part of the sensor station for local processing. Other configurations of LPR sensors may also be useful. For example, the image recognition processor may be remote from the sensor station for remote processing.

Data collected by the sensor network is provided to the trajectory analysis system 140 for analysis. The data can be provided for offline analysis. For example, the data collected may be stored locally and subsequently downloaded to a central storage for offline analysis. Alternatively, the data may be provided for online analysis. For example, the captured data may be streamed to the analysis system for online analysis. Streaming may be achieved using, for example, SAP ESP from SAP SE. Other types of streaming systems may also be useful.

The data collected by the sensors includes vehicle trajectory data. The vehicle trajectory data is structured spatial-temporal data. For example, vehicle trajectory data includes vehicle identifier or id ($v_{id}$), sensor id ($x_{id}$) and time stamp (t). For example, vehicle trajectory data may be ($v_{id}$, $x_{id}$, t). The vehicle id identifies the vehicle which is captured by the sensor, sensor id indicates the sensor station at which the vehicle was captured and time stamp indicates the time when the vehicle was captured by the sensor. A table may be provided with location information associated with the sensor stations. In one implementation, location information is two dimensional location information. The location (loc) information includes longitude (lon) and latitude (lat) coordinates of the sensor station. For example, location information may be (lon, lat). Other types of location information may also be useful. In some implementations, the sensor id may be replaced with location information. For example, the vehicle trajectory data may include ($v_{id}$, loc, t) or ($v_{id}$, lon, lat, t).

As an example, a vehicle having a license plate 77777 passes by sensor station 20 at 7:20:24.5 pm on Jun. 25, 2015. An exemplary data generated by sensor station 20 is shown in Table 1 below:

TABLE 1

| Vehicle ID | Sensor ID | Time |
|---|---|---|
| 77777 | 20 | June 25, 2015 7:20:24.5 PM |

Using a look up table, the location information can be obtained. For example, during pre-processing of raw data, location information may be retrieved from the look up table. An exemplary pre-processed data that may be generated by sensor station 20 is shown in Table 2 below:

TABLE 2

| Vehicle ID | Longitude | Latitude | Time |
|---|---|---|---|
| 77777 | 118.7851535 | 32.051317 | June 25, 2015 7:20:24.5 PM |

In some cases, the data generated by the sensor station includes location information instead of sensor id, as shown in Table 2. Providing various information from the sensor stations in other formats or configurations may also be useful.

The analysis system may act as a server and operate in a networked environment with user devices 108a-c and the data collection unit 120. For example, the analysis system may have a distributed architecture, such as client-server architecture. Other types of architectures may also be useful. A server may include one or more computers or servers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers or servers are connected through a communication network, such as internet, intranet, LAN, WAN or a combination thereof. The servers, for example, are part of the same private network. The servers may be located in a single or multiple locations.

As for a user device, it may be any local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, or a mobile computing device, such as a laptop, a tab or a smart phone. Other types of processing devices may also be used.

The various components of the network may be connected through a communication network 102. For example, components of the network may be connected by an internet, intranet, LAN, WAN or a combination thereof. Other type of networks or network connections may also be useful. For example, network connections may include a WIFI or a 3G/4G/LTE connection. In some cases, the network may be a cloud.

A user may connect to the server using a user device. For example, a user device may include a browser for connecting to the analysis system. The user device may be referred to as the client side while the analysis system may be referred to as the server side. Other types of configurations for the analysis system may also be useful.

The analysis system may include a data source. The data source may be, for example, a database. In one implementation, the data source is a HANA database from SAP SE. Other types of databases may also be useful. The database, for example, may be a database server. The data source stores the vehicle trajectory data collected by the data collection unit.

The analysis system 140 analyzes vehicle trajectory data to determine OD patterns of vehicles in a geographical location of interest. The analysis system may be an analysis server. The analysis server and the database server, for example, are separate servers. For example, the analysis system may include a database server and an analysis server. Providing the data source and analysis system on the same server may also be useful. Other configurations of the analysis system may also be useful.

Trajectories are analyzed and divided into individual OD trips. As discussed, data may be continuously collected. The data may be continuously collected over a long period of time. The collected data may be segmented into sub-periods or segments of time for analysis. The segments can be any length of time. For example, the segment may be 12 hours, 24 hours, multiple days, weekly, or monthly. Other durations for a segment to be analysed may also be useful. For example, the segment may be less than 12 hours or longer than a month. A vehicle's trajectory within a segment may include multiple trips. For example, from home to work, work to lunch, lunch to work and work to home. The analysis determines multiple ODs from the vehicle trajectory data. This enables efficient and accurate determination of traffic patterns, facilitating traffic planning, analysis or visualization systems. The traffic patterns may be used for other applications.

Figure 2:
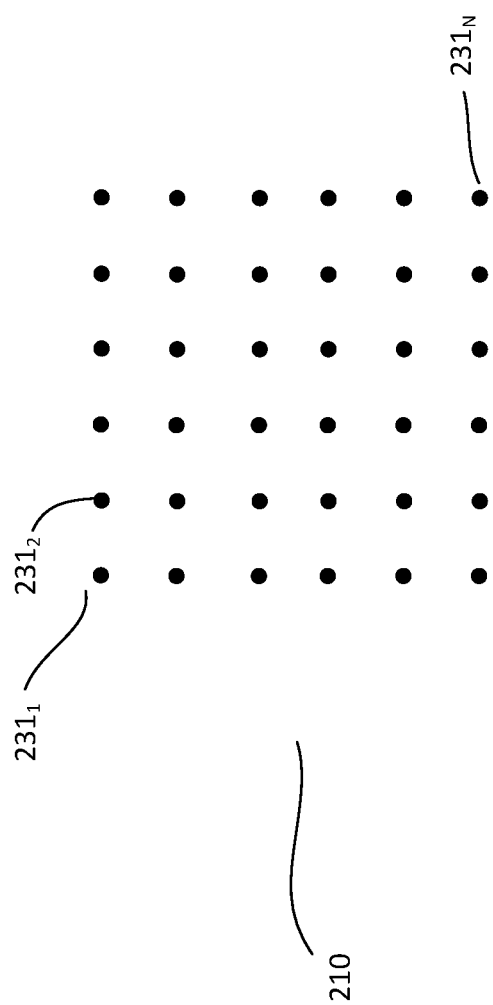
FIG. 2 shows an exemplary embodiment of a sensor network.

FIG. 2 shows a simplified embodiment of a sensor network 210. The sensor network includes a plurality of sensor stations $231_1$-$231_N$ distributed in the geographical area of interest. For example, N number sensor stations are distributed in the geographical area of interest. The geographical area of interest may be a city or a town. Other types of geographical area of interest may also be useful. For example, the geographical area may be of any size or type of area in which traffic pattern or density is of interest. In one implementation, sensor stations include fixed traffic sensors for capturing vehicle information. In one implementation, the sensors include RFID, LPR or a combination of both types of sensors. For example, a sensor station may be an RFID sensor station, a LPR sensor station or an RFID/LPR sensor station. Other types of fixed traffic sensors may also be useful.

As shown, the sensor stations are in a grid arrangement for illustration purposes only. It is understood that the sensor stations are located proximate to streets within the geographical area of interest to capture vehicle spatial-temporal information. By streets, it includes any thoroughfare which a vehicle may access. For example, streets may include roads, avenues as well as highways. Other types of thoroughfare accessible by vehicles are also included. As such, the sensor stations may have a pattern which is based on the streets and need not be equal distance form adjacent sensor stations. For example, a distance between sensor stations may range from 3-20 kilometers (km). Providing other distances between sensor stations may also be useful. The closer the stations, the higher the granularity of the data, but this will produce more data to analyse.

Information captured by the sensor stations, as discussed, includes spatial-temporal information or data. A sensor station has an associated sensor id. Through the sensor id, the spatial information of a captured vehicle is known. When a vehicle is captured by a sensor station, the sensor station generates spatial-temporal data of the captured vehicle. For example, the data includes sensor id, which indicates location, vehicle id, which indicates the vehicle, and time, which indicates when the vehicle was captured. Data generated by the sensor network include trajectory data of all vehicles travelling within the geographical area of interest.

The trajectory data provides an ordered sequence of spatial and temporal sampling points along a vehicle's trajectory. For example, a vehicle trajectory will be an ordered sequence of points from $\{(x_1, t_1), \ldots, (x_i, t_i), (x_{i+1}, t_{i+1}), \ldots, (x_N, t_N)\}$, where $x_i$ is the spatial location provided by, for example, sensor id at time $t_i$ for any i=1 (first entry of the trajectory) to N (last entry of the trajectory). As discussed, $v_{id}$ is also included in trajectory data. The trajectory data may serve as historical data for analysis. For example, trajectory data may be segmented into daily data, weekly data or monthly data. Segmenting the data into other granularities may also be useful.

Figure 3:
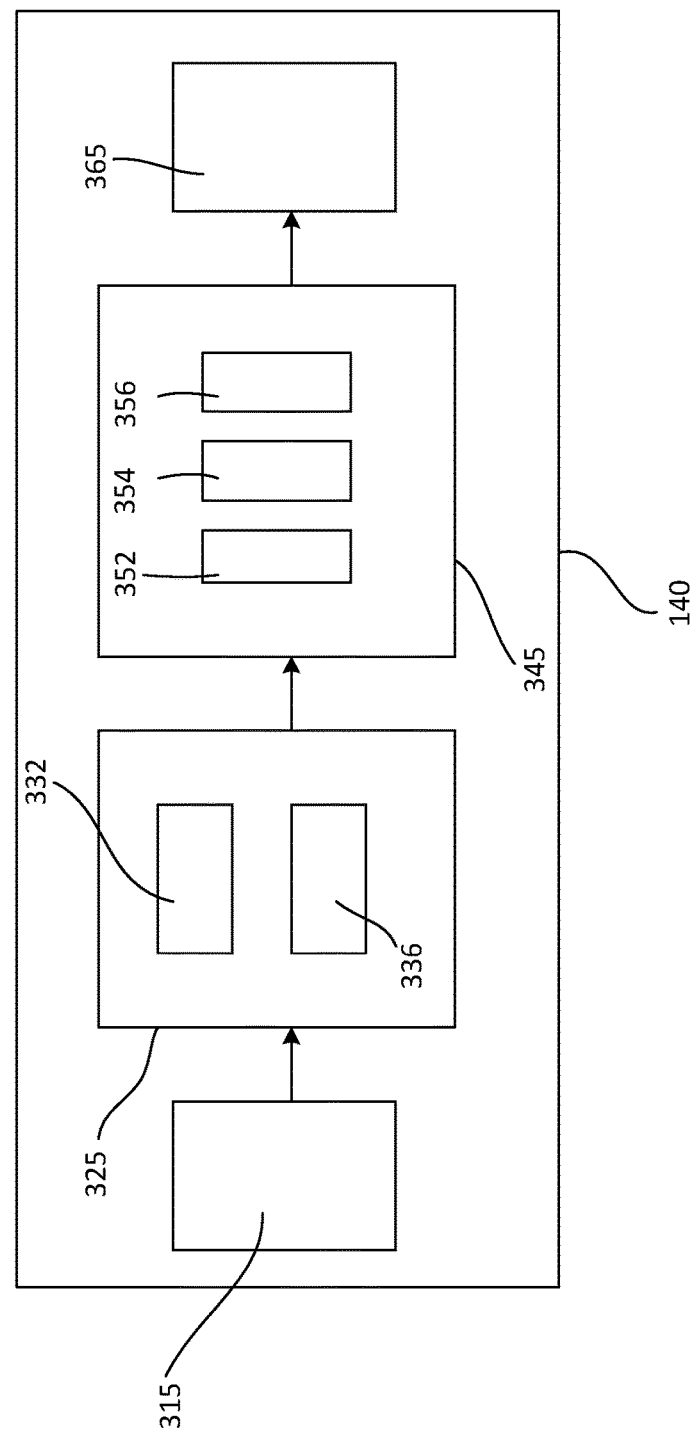
FIG. 3 shows a block diagram of an OD analyzer.

FIG. 3 shows a block diagram of a trajectory analysis system 140. The system may include a data storage module 315, a pre-processor module 325, and a processor module 345. The data storage module stores data from the vehicle sensor network. For example, the data storage module stores raw vehicle trajectory data from the sensor network with fixed sensor stations. The raw data, for example, includes vehicle spatial-temporal data captured by the sensor network. An entry, for example, includes $(v_{id}, x_{id}, t)$. Providing entries in other formats, such as $(v_{id}, lon, lat, t)$ may also be useful.

The pre-processor module pre-processes the data stored in the data storage module. In one implementation, the pre-processor module includes a vehicle pre-processing unit 332 which processes the data by vehicles. For example, the data may be sorted based on vehicles. This, for example, produces vehicle trajectory data, vehicle by vehicle.

FIG. 4 shows an exemplary pre-processed data 400 from the vehicle pre-processing unit. The pre-processed data may be compiled in a data table. The table, for example, includes columns for vehicle id 437, time stamp 447 and location information 457. In one implementation, location information includes longitude 463 and latitude 466 coordinates. For example, location information includes two columns, one for longitude and one for latitude. Other formations for location information may also be useful. In addition, the column may further include a sequence column 427, indicating the sequence of the data. For example, 1 indicates the first data in the sequence of the trajectory (e.g., i=1) and 2 is the second data in the sequence of the trajectory (i=2). Other table formats may also be included. Illustratively, the table shows trajectory data of a vehicle for one day. Other durations or granularities may also be useful.

Referring back to FIG. 3, the pre-processor module includes a pre-processing station unit 336 which sorts and aggregate the data based on sensor station to sensor station. For example, the data may be arranged based on transition from one station to another. This produces groupings of all vehicles between station pairs.

As for the processor module 345, it processes the pre-processed data to produce ODs of vehicles. In one implementation, the processor module 345 includes an intermediate step predictor (ISP) unit 352. The ISP module analyzes the pre-processed data to determine a probability of a number of intermediate steps k between a recorded sensor station pair. For example, a vehicle traveling from station i to station i+1 is estimated to have a probability of traveling via a given number of k intermediate steps. For example, if k=1, the vehicle travelled between a pair of stations in 1 step. On the other hand, if k=2, the vehicle transitioned from station i to station i+1 in two steps. This indicates that an intermediate station was dropped out (failed to capture the vehicle). For example, one intermediate station was dropped out. For higher k values, the number of dropped out intermediate stations is k−1. The probability may be determined from equation 1 (Eq 1) as follows:

$$P(S^i = k) = \frac{\sum_{v=1}^{N^i} I(n_v^i = k)}{N^i} \quad \text{(Eq 1)}$$

where I(•) is the indicator function, $N^i$ is the number of vehicles traveling from i to i+1 within a given time interval and $n_v^i$ is the number of intermediate stations for vehicle v in the dataset stored in the storage module.

Equation 1 counts the number of vehicles traveling between any two sensor stations for a given number of steps k. For example, k can be from 1 to K, where K is the maximum number of steps traveling between the sensor station pair. A user may select the value of K to limit the maximum number of steps which may be possible between a station pair. Given the fact that the vehicle traveling from i to i+1 is observed in just one step, the probability of the actual number of intermediate steps k may be estimated by equation 2 (Eq 2) is as follows:

$$P(S^i = k \mid S^i_{obs} = 1) = \frac{k\theta^{k-1}(1-\theta)P(S^i = k)}{\sum_{k=1}^{K} k\theta^{k-1}(1-\theta)P(S^i = k)} \quad \text{(Eq 2)}$$

When K, the maximum number of steps between two stations is too large, the probability becomes negligibly small. As such, K may be set at a value which covers reasonable number of possible steps while producing a desired range of probabilities. For example, K may be set at about 10. Setting K at other numbers may also be useful. As for the parameter θ, it is an estimated average dropout rate of a sensor station. For example, there is a possibility that a sensor station may fail to record a passing vehicle. The parameter θ may be set at 10% or 0.1. For example, 10% of the time, a sensor may fail to record a passing vehicle. Other θ values may also be useful.

The processor module includes a time travel predictor (TTP) unit 354. The TTP module analyses the pre-processed data to estimate, for a given number of k steps (sensor station dropped-out by chance), the probability for a trip with travel time more extreme or slower than $\Delta t_i$, where $\Delta t_i$ is the travel time between the station pair, i and i+1 of the vehicle of interest. This probability is determined by the following equation (Eq 3):

$$P(\Delta T \geq \Delta t_i \mid k) = \frac{\sum_{v=1}^{N^i} I(n_v^i = k) \cdot I(\Delta t_v^i \geq \Delta t_i)}{\sum_{v=1}^{N^i} I(n_v^i = k)} \quad \text{(Eq 3)}$$

where $\Delta t_v^i$ is the travel time from i to i+1 of vehicle v. This step involves counting the number of vehicles traveling more extreme than $\Delta t_i$ given the fact that they all travel over k intermediate steps. The TTP unit calculates the probability distribution of travel time from station $x_i$ to station $x_{i+1}$ over a number of (dropped-out) intermediate stations. The processor module includes a stop determination (SD) unit 356. The SD unit determines the stop probability between a station pair. In one implementation, the stop probability between a station pair is determined based on Eq 1, Eq 2 and Eq 3 using the following equation 4 (Eq 4):

$$P(\Delta T \geq \Delta t_i \mid S^i_{obs} = 1) = \sum_{k=1}^{K} P(\Delta T \geq \Delta t_i \mid k) \cdot P(S^i = k \mid S^i_{obs} = 1) \quad \text{(Eq 4)}$$

In one implementation, the SD unit analyzes vehicle trajectories to determine ODs in the trajectories. For example, the SD unit performs OD analysis on vehicle trajectories, determining vehicle trips within the trajectories. The SD unit analyses each vehicle trajectory to determine separate trips within the trajectory. In one implementation, a probability less than 0.05 is used as a threshold (stop probability threshold or $P_{ST}$) to decide whether there is a "stop" (or "abnormal") in the trajectory between station i to station i+1. For example, if the trajectory from station i and station i+1 is considered separated (i.e., a stop exist), the node corresponding to station i is identified as the destination (D) of the previous trip in the trajectory, and the node corresponding to station i+1 is identified as the origin of the next trip. Using other stop probability thresholds may also be useful. The vehicle trajectories may be analysed on a daily basis. Analysing the trajectory using other durations or granularities may also be useful.

As discussed, a stop is determine if the probability exceeds the $P_{ST}$ stop probability threshold. The number of stops may be directly related to $P_{ST}$. For example, a higher $P_{ST}$ may increase the number of station pairs to be determined as stops. This may result in increased number of incorrectly identified stops along a trajectory. On the other hand, a lower $P_{ST}$ may lower the number of station pairs to be determined as stops. This may result in a failure to recognize stops along the trajectory. The value of $P_{ST}$ may be selected empirically or estimated using a set trajectory data with known true stops. Other techniques for determining $P_{ST}$ may also be useful.

In one implementation, the analysis system may include a result storage module 365. The result storage module, for example, stores the results of the SD unit. In one implementation, the result storage module stores OD analysis from the SD unit.

FIG. 5 shows an exemplary result of OD analysis 500. The result, for example may be stored in the result storage module. Storing the results in other locations may also be useful. The results may be presented in an end-user device. In one implementation, the OD analysis includes a location transition column 529, stop probability column 539 and a stopped column 549. Based on the analysis, the stop probability can be determined using equation 4. Depending on whether the probability exceeds the threshold ($P_{ST}$) or not, the transition from one station to another is determined to be a stopped or not. In one implementation, the transition is a stop if the probability is less than 0.05. Other thresholds may also be useful.

Figure 6:
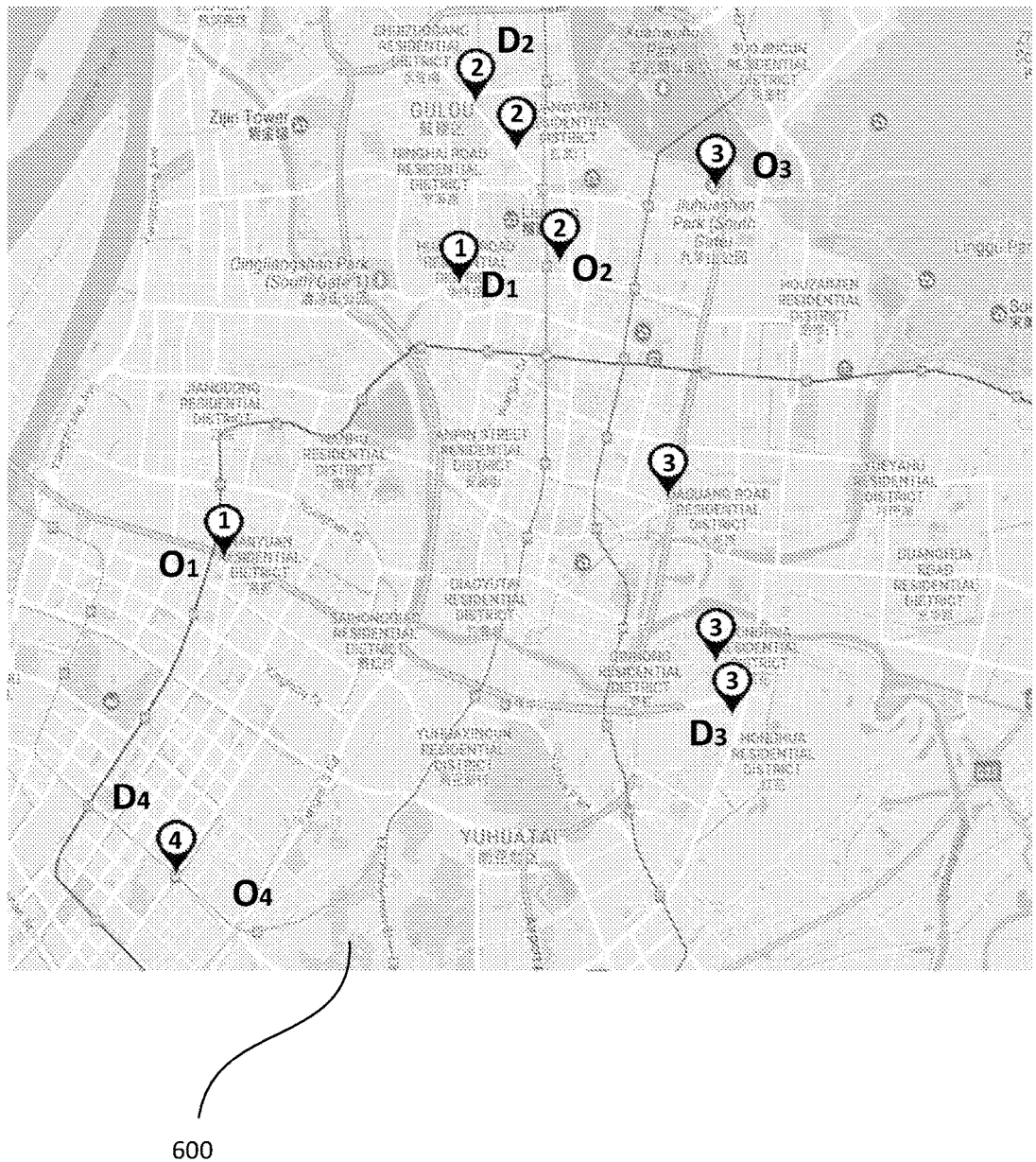
FIG. 6 illustrates visualizing results of an OD analysis on a map.

FIG. 6 illustrates the results of the OD analysis of FIG. 5 on a map 600 of the geographical area of interest. Based on the results, the vehicles trajectory within the day is separated into four separate trips. For example, trip 1 corresponds to the data points 1-2 ($O_1$ and $D_1$) of the sequence, trip 2 corresponds to data points 2-6 ($O_2$ and $D_2$) of the sequence, trip 3 corresponds to data points 6-9 ($O_3$ and $D_3$) of the sequence and trip 4 corresponds to data points 9 and 10 ($O_4$ and $D_4$).

As described, the various modules of the analysis system may be embodied as an application. For example, the various modules may be embodied as a software application. The modules may be integrated into an existing software application, as an add-on or plug-in to an existing application, or as a separate stand-alone application. The source code of the application may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A computer-implemented method for origin-destination (OD) analysis of vehicle trajectory data, comprising:
    providing a vehicle trajectory data set to an OD analyzer, the vehicle trajectory data set includes vehicle trajectory data collected from a sensor network having a plurality of sensor stations for detecting vehicles, the sensor stations of the sensor network are distributed in a geographical area of interest, wherein the vehicle trajectory data include trajectories of vehicles captured by the sensor network;
    analyzing the vehicle trajectory data set by the OD analyzer to determine an origin and a destination of trips for trajectories of the vehicles in the vehicle trajectory data set, wherein the OD analysis comprises,
        calculating a probability distribution of travel time between sensor station pairs of the sensor network over a number of (dropped-out) intermediate stations, and
        determining a stop probability between a station pair in the trajectories of the vehicles, wherein a stop is a destination of a previous trip and an origin of a next trip in the trajectories; and
    wherein the OD analysis performed by the OD analyzer determines traffic patterns in the geographical area of interest which facilitates traffic planning in the geographical area of interest.

2. The computer-implemented method of claim 1 wherein a sensor station comprises a fixed traffic sensor.

3. The computer-implemented method of claim 2 wherein the fixed traffic sensor comprises a radio-frequency identification (RFID) sensor, a license plate recognition (LPR) sensor or both.

4. The computer-implemented method of claim 1 wherein a data record of the trajectory data in the data set comprises structured data including:
    a vehicle id, the vehicle id is a unique identifier for identifying a vehicle;
    a sensor id, the sensor id is a unique identifier for a sensor station in the sensor network, wherein the sensor id is used to determine location information using a look up table, wherein the location information includes longitude and latitude coordinates of the sensor station; and
    a time stamp, the time stamp indicates when the vehicle identified by the vehicle id is captured by the sensor station identified by the sensor id.

5. The computer-implemented method of claim 1 wherein a data record in the trajectory data set comprises structured data including:
    a vehicle id, the vehicle id is a unique identifier for identifying a vehicle;
    location information, wherein the location information includes longitude and latitude coordinates of a sensor station which captures the vehicle identified by the vehicle id; and
    a time stamp, the time stamp indicates when the vehicle is captured by the sensor station.

6. The computer-implemented method of claim 1 wherein the OD analyzer comprises a pre-processor module, the pre-processor module sorts and aggregates the vehicle trajectory data based on:
    a vehicle id; and
    station pairs traveled by vehicles in the trajectory data.

7. The computer-implemented method of claim 6 wherein the OD analyzer comprises a processor module, the processor module analyzes pre-processed data from the pre-processor module.

8. The computer-implemented method of claim 7 wherein the processor module performs:
    calculating the probability distribution of travel time between the sensor station pairs of the sensor network over a number of (dropped-out) intermediate stations; and
    determining the stop probability between the station pair in the trajectories of the vehicles, wherein the stop is the destination of the previous trip and the origin of the next trip in the trajectories.

9. The computer-implemented method of claim 8 wherein calculating the probability distribution of travel time between the sensor station pairs of the sensor network over a number of (dropped-out) intermediate stations comprises:
    determining, by an intermediate step predictor (ISP) unit, a probability of an actual number of intermediate steps k between the sensor station pairs; and
    determining, by a time travel predictor (TTP) unit, for a given number of k steps with dropped-out intermediate sensor stations, a probability that a trip between the sensor station pairs with a travel time more extreme than $\Delta t$, where $\Delta t$ is the travel time between the station pairs of a vehicle.

10. The computer-implemented method of claim 9 wherein determining the probability of the actual number of intermediate steps k between the sensor station pairs comprises:
    determining a probability of a number of k intermediate steps using Eq 1

$$P(S^i = k) = \frac{\sum_{v=1}^{N^i} I(n_v^i = k)}{N^i}; \quad \text{(Eq 1)}$$

determining the probability of the actual number of intermediate steps k using Eq 2

$$P(S^i = k \mid S_{obs}^i = 1) = \frac{k\theta^{k-1}(1-\theta)P(S^i = k)}{\sum_{k=1}^{K} k\theta^{k-1}(1-\theta)P(S^i = k)}; \quad \text{(Eq 2)}$$

and determining the probability that trip between the sensor station pairs exceeds the travel time $\Delta t$ using Eq 3

$$P(\Delta T \geq \Delta t_i \mid k) = \frac{\sum_{v=1}^{N^i} I(n_v^i = k) \cdot I(\Delta t_v^i \geq \Delta t_i)}{\sum_{v=1}^{N^i} I(n_v^i = k)}.$$ (Eq 3)

11. The computer-implemented method of claim 10 wherein determining the stop probability between the station pair comprises using Eq 4

$$P(\Delta T \geq \Delta t_i \mid S_{obs}^i = 1) = \sum_{k=1}^{K} P(\Delta T \geq \Delta t_i \mid k) \cdot P(S^i = k \mid S_{obs}^i = 1).$$ (Eq 4)

12. The computer-implemented method of claim 11 wherein a stop between the station pair is determined when the stop probability is less than a probability stop threshold ($P_{ST}$).

13. The computer-implemented method of claim 8 wherein determining the stop probability between the station pair comprises determining by a stop determination (SD) unit.

14. An origin-destination (OD) analysis system comprising:
a data storage module for storing a vehicle trajectory data set, the vehicle trajectory data set includes vehicle trajectory data collected from a sensor network having a plurality of sensor stations for detecting vehicles, the sensor stations of the sensor network are distributed in a geographical area of interest, wherein the vehicle trajectory data include trajectories of vehicles captured by the sensor network;
a pre-processor module, wherein the pre-processor module processes the vehicle trajectory data set by sorting and aggregating the vehicle trajectory data;
a processor module, the processor module performs an OD analysis on the processed trajectory data from the pre-processor module to
calculate a probability distribution of travel time between sensor station pairs of the sensor network over a number of (dropped-out) intermediate stations, and
determine a stop probability between a station pair in the trajectories of a vehicle, wherein a stop is a destination of a previous trip and an origin of a next trip in the trajectories; and
wherein the OD analysis determines traffic patterns in the geographical area of interest which facilitates traffic planning in the geographical area of interest.

15. The OD analysis system of claim 14 wherein a sensor station comprises a fixed traffic sensor.

16. The OD analysis system of claim 14 wherein a data record of the vehicle trajectory data in the data set comprises:
a vehicle id, the vehicle id is a unique identifier for identifying a vehicle;
a sensor id, the sensor id is a unique identifier for a sensor station in the sensor network, wherein the sensor id is used to determine location information using a look up table, wherein the location information includes longitude and latitude coordinates of the sensor station; and
a time stamp, the time stamp indicates when the vehicle identified by the vehicle id is captured by the sensor station identified by the sensor id.

17. The OD analysis system of claim 14 wherein the pre-processor module sorts and aggregates the vehicle trajectory data based on:
a vehicle id; and
station pairs traveled by vehicles in the trajectory data.

18. The OD analysis system of claim 17 wherein:
the processor module comprises
an intermediate step predictor (ISP) unit for determining a probability of an actual number of intermediate steps k between the sensor station pairs, and
a time travel predictor (TTP) unit for determining, for a given number of k steps with dropped-out intermediate sensor stations, a probability that a trip between the sensor station pairs with a travel time more extreme than $\Delta t$, where $\Delta t$ is the travel time between the station pairs of a vehicle; and
the ISP and TTP units calculate the probability distribution of the travel time between the sensor station pairs of the sensor network over the number of (dropped-out) intermediate stations.

19. The OD analysis system of claim 18 wherein the processor module comprises a stop determination (SD) unit for determining the stop probability between the station pair.

20. A non-transitory computer-readable medium having stored thereon program code, the program code executable by a computer for performing origin-destination (OD) analysis of vehicle trajectory data comprising:
pre-processing a vehicle trajectory data set by a pre-processor module of an OD analyzer, the vehicle trajectory data set includes vehicle trajectory data collected from a sensor network having a plurality of sensor stations for detecting vehicles, the sensor stations of the sensor network are distributed in a geographical area of interest, wherein the vehicle trajectory data include trajectories of vehicles captured by the sensor network;
analyzing the vehicle trajectory data set by a processor module of the OD analyzer to determine an origin and a destination of trips for the trajectories of the vehicles in the vehicle trajectory data set, wherein analyzing comprises,
calculating a probability distribution of travel time between sensor station pairs of the sensor network over a number of (dropped-out) intermediate stations, and
determining a stop probability between a station pair in the trajectories of the vehicles, wherein a stop is a destination of a previous trip and an origin of a next trip in the trajectories; and
wherein analyzing the vehicle trajectory data determines traffic patterns in the geographical area of interest which facilitates traffic planning in the geographical area of interest.

* * * * *